Feb. 7, 1956    B. W. BADENOCH    2,733,688
CONSTANT GAIN HYDRAULIC POWER CONTROL SYSTEM
Filed Jan. 18, 1954

*INVENTOR.*
BENJAMIN W. BADENOCH
BY
Ralph L. Tweedale
ATTORNEY

United States Patent Office 2,733,688
Patented Feb. 7, 1956

2,733,688

CONSTANT GAIN HYDRAULIC POWER CONTROL SYSTEM

Benjamin W. Badenoch, Los Angeles, Calif., assignor to Vickers Incorporated, Detroit, Mich., a corporation of Michigan Application January 18, 1954, Serial No. 404,535

10 Claims. (Cl. 121—41)

This invention relates to power transmissions, and is particularly applicable to those of the type comprising two or more fluid pressure energy translating devices, one of which may function as a pump and another as a fluid motor.

The invention is primarily concerned with hydraulic transmissions of the type recited having servo mechanism incorporated therein and in particular is concerned with providing a constant gain, servo mechanism control system.

In hydraulic servo control systems the servo control valve which is linked to the motor to provide a follow-up action may be utilized both as a directional and as a power control valve. The servo valve functions as a power control valve by metering motor fluid in desired quantities which vary with the deflection of the valve from neutral position. "Gain" of the valve may be defined to mean the slope of the flow versus deflection curves. A steeper slope, that is, more flow for a given deflection of the valve, is called a higher gain.

In a servo mechanism system wherein there is provided a substantially constant pressure fluid source and the load is constant, it is a comparatively simple matter to maintain a predetermined system gain. If the flow is constant and the load constant the pressure drop across the throttle of the servo control valve remains substantially constant for given deflections of the servo valve. As the gain or sensitivity of the servo control valve is proportional to the pressure drop across the valve, a responsive or sensitive system with fairly accurate predetermined gain may be designed.

Where, however, variables are present in the system ahead of or beyond the servo control valve, such as load changes produce, the problem becomes a very difficult one and the designer has been faced with compromising and making sacrifices involving sensitivity, system gain, and system stability. Thus, in a variable load system, when the load is high the pressure at the motor is high and the relatively low pressure drop across the servo control valve causes it to be relatively insensitive and the gain of the valve is extremely low. When the load is low the pressure at the motor is low and the relatively high pressure drop across the throttle of the servo control valve causes it to be extremely sensitive and the gain of the valve is extremely high. The large variations in gain in any one particular system can vary from extreme sluggishness to extreme instability.

When the control of the motor is erratic and not responsive to given deflections of the power control valve the system is said to be unstable. The system is also said to be unstable when there is present undesired self-sustained oscillations of the motor and valve. These oscillations may occur not only during normal operation of the system but also occur from shock loads. Servo engineers are well aware of these well known conditions wherein there is continual overshooting of the servo valve to reach an equilibrium position, the rapid oscillation of the valve being termed "hunting."

In servo control or follow-up control systems there are a combination of factors which cause these conditions, some of which are lags in feedback caused for example, by looseness of the linkage, flexibility, and unfavorable Bernoulli forces across the servo control valve. These factors reinforce each other, particularly in high gain systems in which a small motion of the valve causes a large and a rapid motion of the load, with a resultant large and rapid correction at the servo valve through the feedback. Damping may be introduced to counteract these tendencies but must be so great in order to stabilize the system against the combined reinforced tendencies, that it counteracts any rapid controlled motion of the servo valve and hence is undesirable from this standpoint.

It is therefore an object of the present invention to provide a hydraulic servo mechanism system which will circumvent the aforementioned difficulties.

It is another object of the present invention to provide a constant gain, hydraulic servo mechanism system.

It is still another object of the present invention to provide a hydraulic servo mechanism system wherein the system gain is constant independently of pressure or load variations.

It is a further object of this invention to provide a constant gain hydraulic servo control system which is responsive, stable and highly efficient.

Further objects and advantages of the present invention will be apparent from the following description, reference being had to the accompanying drawing wherein a preferred form of the present invention is clearly shown.

Figure 1:
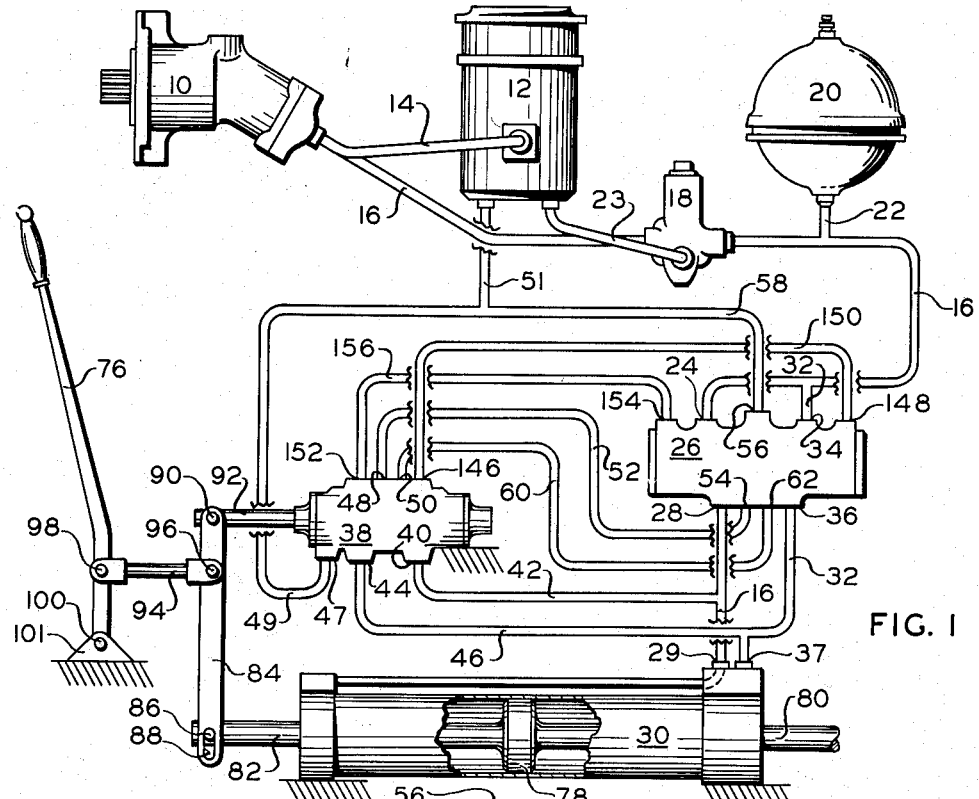
Figure 1 is a diagrammatic view of a hydraulic power transmission system embodying a preferred form of the present invention.

Referring now to Figure 1 there is shown a constant displacement pump 10, which may be driven by a prime mover, such as an aircraft engine, not shown. The pump 10 is supplied with fluid from a reservoir 12, being connected thereto by a supply conduit 14, and delivers fluid into a pressure delivery conduit 16 in which is incorporated and unloading valve 18 and an accumulator 20 by a branch conduit 22. The unloading valve 18 by-passes the delivery of pump 10 to tank 12 by means of an unloading conduit 23 when a predetermined pressure is created in the accumulator 20.

Figure 2:
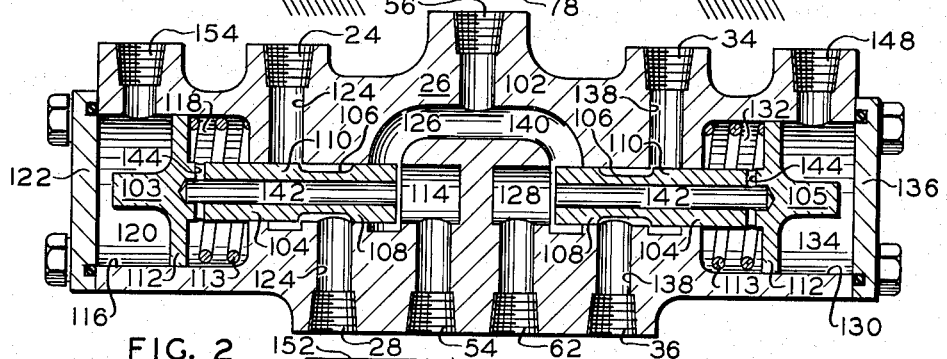
Figure 2 is a longitudinal sectional view of a power control valve incorporated in the hydraulic system shown in Figure 1.

The pressure delivery conduit 16 is connected to a pressure inlet port 24 of a power control valve 26, shown in detail in Figure 2, and extends from a pressure outlet port 28 of the valve to a left end operating port 29 of a balanced, double acting fluid motor 30. The pressure conduit 16 is also connected by a branch conduit 32 to a duplicate pressure inlet port 34 of the power control valve 26 and extends from a duplicate pressure outlet port 36 of the valve to a right end operating port 37 of motor 30.

Figure 3:
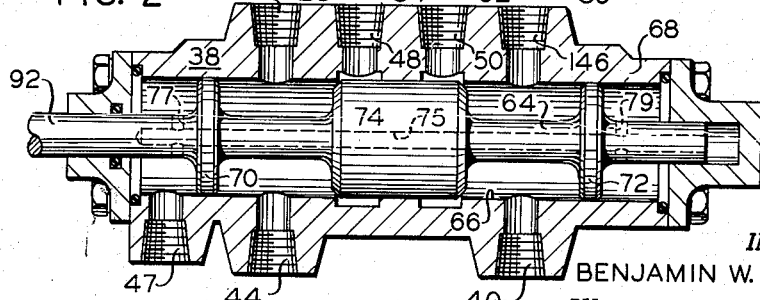
Figure 3 is a longitudinal sectional view of a servo control valve incorporated in the hydraulic system shown in Figure 1.

The directional operation of motor 30 is controlled by a servo control valve 38 shown in detail in Figure 3. The pressure supply conduit 16 is connected to a motor port 40 of the servo valve 38 by a branch conduit 42 while the branch pressure supply conduit 32 leading from the pressure outlet port 36 of the power control valve 26 is connected to another motor port 44 of the servo valve 38 by means of a branch conduit 46. The servo valve is provided with a port 47 to which the opposite ends of the valve are vented and which is connected to tank 12 by means of conduits 49 and 51.

As the pressure fluid supply source is directly connected to opposite ends of the motor 30, the servo valve 38 controls the directional operation of the motor by selectively connecting opposite ends of the motor to the tank 12. Accordingly the servo valve 38 is provided with return ports 48 and 50 and when the motor 30 is operated in a rightward direction, the displacement from the right end of the motor and port 37 is conducted therefrom to the servo valve and by means of the return port 48 thereof to a motor return conduit 52 which leads to an inlet return port 54 of the power control valve 26. It is then conducted from a return outlet port 56 of the power control valve 26 to tank 12 by means of a conduit 58 which is connected to tank conduit 51.

When the motor 30 is operated in a leftward direction, the displacement from the left end of said motor and port 29 thereof is conducted to the servo valve 38 and from the return port 50 thereof by means of a conduit 60 to a duplicate inlet return port 62 of the power control valve 26 and from the return outlet port 56 of the power control valve to the tank conduit 51 and tank 12 by means of return conduit 58.

The servo valve 38 is provided with a piston or spool 64 mounted within a bore 66 of a body or housing 68, said spool 64 being provided with end lands 70 and 72 and a relatively larger center land 74. The return ports 48 and 50 of valve 38 are enlarged at their point of intersection at the bore 66 and center land 74 is tapered at its opposite ends in a manner to provide a throttle for proper metering of fluid across the ports 44 and 48 and across the ports 40 and 50. The opposite ends of the control valve are vented to the port 47 by means of a longitudinal passage 75 constructed in the spool 64 which opens to opposite ends of the spool bore 66 beyond the end lands 70 and 72 by means of transverse passages 77 and 79. The spool 64 is disclosed as having a control handle for manual operation thereof which is illustrated diagrammatically and indicated by the numeral 76.

The motor 30 is provided with a fluid operated piston 78 having a piston rod 80 associated therewith extending from one end of the motor adapted for connection to a load device such as an aircraft control surface. The piston 78 also has associated therewith a piston rod 82 extending from the opposite end of the motor which is connected to one end of a link 84 by a pin 86 slidable in a slot 88 of the link 84. The opposite end of the link 84 is pivotally connected to a pin 90 associated with an extending portion 92 of the servo valve spool 64. The control lever 76 is connected to the link 84 by a link 94 pivotally connected at 96 to the link 84 and pivotally connected at 98 to the control lever 76. The lower end of the control lever 76 may be pivotally connected at 100 to a bracket 101 which may be suitably stationarily fastened to the frame of a vehicle or aircraft. The servo valve body 68 and motor 30 are also adapted to be stationarily fastened to the same frame.

The power control valve 26 is comprised of a body 102 housing duplicate pressure operated throttle mechanisms indicated generally by the numerals 103 and 105. When the motor 30 is selectively operated only one throttle mechanism is adapted to be effective, the particular throttle mechanism being dependent upon the operating position of the servo valve 38. When the servo valve 38 is in the neutral position shown, it permits leakage across the ports thereof and both throttle mechanisms are effective for reasons hereinafter explained. Each throttling mechanism is designed to simultaneously meter fluid to and from the motor and is adapted to maintain a substantially constant pressure drop across the servo valve throttle in a manner to provide a constant gain for every opening of the servo valve throttle. Each throttling mechanism is comprised of a piston or spool 104 having a groove 106 forming throttling lands 108 and 110. Each spool is also provided with an operating piston 112 and a spring 113 abutting one side of the piston to bias the throttling mechanism toward the fully open position.

The spool 104 of throttling mechanism 103 is shiftably mounted within a longitudinal bore 114 while the operating piston 112 therefor is mounted within an enlarged bore 116 to form chambers 118 and 120 on opposite sides of the piston 112. An end cover 122 closes the open end of enlarged bore 116. The ports 24 and 28 of the power control valve 26 are connected to opposite sides of the spool bore 114 by a passage 124 which intersects opposite sides of the bore 114 in an offset manner. Port 54 leads directly to the right end of bore 114 while port 56 leads to the same end of the bore but on the opposite side thereof in an offset manner by a branch passage 126. The land 110 is adapted to control flow to the motor across the power control ports 24 and 28 through the passage 124 while the land 108 is adapted to control flow from the motor across the ports 54 and 56 through the passage 126.

The spool 104 of throttling mechanism 105 is shiftably mounted within a longitudinal bore 128 while the operating piston 112 thereof is mounted within an enlarged bore 130 to form chambers 132 and 134 on opposite sides of the piston 112. An end cover 136 closes the open end of enlarged bore 130. The power control valve ports 34 and 36 are connected to opposite sides of the spool bore 128 in an offset manner by a passage 138. The port 62 leads directly to the left end of bore 128 while port 56 leads to the same end of bore 128 by a branch passage 140. The land 110 of throttling mechanism 105 is adapted to control flow to the motor across the power control ports 34 and 36 through the passage 138 while the land 108 of said throttling mechanism is adapted to control flow from the motor across the power control valve ports 62 and 56 through the passage 140.

Each throttling spool is provided with a longitudinal passage 142 extending from one end of said spools to a transverse passage 144 which opens at the inner side of the pistons 112 of the throttling mechanisms to the chambers 118 and 132. In this manner motor return pressure, either in the return line 52 or 60 beyond the servo valve throttle 74 is respectively transmitted either by port 54 or port 62 to the bores 114 and 118 and thence to the underside of the control pistons 112.

When the motor 30 is being operated in a leftward directional movement pressure existent in the motor return line 42 ahead of the servo valve throttle 74 is transmitted from port 40 of servo valve 38 across the valve bore 66 thereof to a port 146 which is connected to an end port 148 of power control valve 26 by a conduit 150. The power control valve port 148 leads directly to the chamber 134 so that any pressure increases or decreases ahead of the throttle 74 is transmitted by the means recited directly to the chamber 134 to act on the control piston 112 of the throttling device 105.

When the motor 30 is being operated in a rightward directional movement pressure existent in the motor return line 46 ahead of the servo valve throttle 76 is transmitted from port 44 of servo valve 38 across the valve bore 66 thereof to a port 152 which is connected to an end port 154 of power control valve 26 by a conduit 156. The power control valve port 154 leads directly to the chamber 120 so that any pressure increases or decreases ahead of the throttle 74 is transmitted by the means recited directly to the chamber 120 to act on the control piston 112 of the throttling device 103.

With the system in operation, if the servo valve spool 64 is shifted to the left, with the pressure source connected to both ends of the motor and the servo ports 44 and 48 closed to each other by land 74 of the servo valve and as the return ports 40 and 50 thereof are open to each other, the motor 30 will be operated in a leftward directional movement. Fluid from the accumulator 20 and pump 10 is conducted by pressure conduit 16 to the inlet port 34 of power control valve 26 where, by means of passage 138, it is conducted across the bore 128 thereof to the outlet port 36 thereof and by means of conduit 32 to the right end port 37 of motor 30. The displacement from the left end of motor 30 is conducted by means of motor port 29 and conduits 16 and 42 to the return port 40 of servo valve 38 and across bore 66 to port 50 thereof and thence by conduit 60 to the inlet return port 62 of the power control valve 26. From the port 62 return fluid is conducted to the bore 128 and by the passage 140 to the outlet return port 56 and thence by means of conduits 58 and 51 to tank 12.

The throttling device 105 is effective to meter fluid to and from the motor 30 and to control the pressure drop and thus the flow rate across the servo valve throttle 74 in the following manner. The pressure existent at the displacement or left end of motor 30 ahead of throttle 74 of servo valve 38 is transmitted to chamber 134 of power control valve 26 by means of conduit 16, servo valve port 40, valve bore 66, port 146, conduit 150, and port 148 of power control valve 26. The pressure existent in the motor return conduit 60 beyond the servo valve throttle 74 is transmitted to chamber 132 on the opposite side of piston 112 of throttling device 105 by means of servo valve port 50, conduit 60, port 62 and bore 128 of power control valve 26, bore 128, and longitudinal and transverse spool passages 142 and 144 for throttling mechanism 105. Any increase in pressure at the return side of the motor ahead of throttle 76 causes the piston 112 to shift spool 104 to the left and lands 108 and 110 respectively close the pressure inlet and motor return passages 138 and 140 more fully to compensate for said pressure changes at the motor. Any decrease in pressure at the motor causes the spring 113 to shift the operating piston 112 and thus the spool 104 thereof more fully towards the open position. In this manner both the fluid delivered to the motor and the return from the motor are simultaneously automatically throttled under the control of the pressure throttling mechanism 105. The fluid flowing to and from the motor will be maintained at a rate commensurate with every given opening of servo valve throttle 74 across the motor return ports 40 and 50 of the servo valve because the throttling mechanism 105 maintains the pressure drop across the servo valve throttle 74 substantially constant.

The throttling mechanism 103 meanwhile remains ineffective during selective leftward operation of motor 30. As the return ports 44 and 48 of the servo valve are closed, motor operating pressure is transmitted by means of conduits 32 and 46 to the servo valve port 44 across the valve bore 66 to servo valve port 152 and thence to chamber 120 of throttling mechanism 103 by means of conduits 156 and power control valve port 154. Chamber 118 of the same throttling device is connected to tank 12 by means of spool passages 144 and 142, bore 114, passage 126, port 56 and conduits 58 and 51. With a high pressure differential present relatively greater than the force of spring 113 the piston 112 of the throttling mechanism 103 is shifted rightwardly to cause lands 110 and 108 of spool 104 to close the passages 124 and 126.

If the servo valve control handle 76 is shifted rightwardly the motor 30 will be operated in a rightward directional movement. With the pressure fluid source connected simultaneously to both ends of the motor, as land 74 of servo valve 38 blocks flow across the return ports 40 and 50 and permits return flow across the return ports 44 and 48 the piston 78 of the motor 30 is operated in a rightward direction.

Throttling device 105 becomes ineffective in the following manner. As the return ports 40 and 50 of the servo valve 38 are closed by the servo valve throttle 74, motor operating pressure is transmitted by means of pressure conduits 16 and 42 and across the servo valve ports 40 and 146 to conduit 150 and thence to port 148 of power control valve 26 and to chamber 134 of throttling device 105. Chamber 132 on the opposite side of operating piston 112 is connected to tank 12 by means of spool passages 144 and 142, bore 128, passage 140 and port 56 of power control valve 26, and conduits 58 and 51. With a high pressure differential present relatively greater than the force of spring 113 of the throttling device 105 the piston 112 thereof is shifted to the left to operate the spool and lands 110 and 108 thereof to close the passages 138 and 140.

Throttling device 103 is effective during selective rightward operation of the motor to throttle fluid to and from the motor and to control the pressure drop across the throttle 74 of servo valve 38 in the following manner:

The pressure in the motor return line 46 ahead of throttle 74 is transmitted by means of servo valve port 44 across the bore 66 to port 152 and by means of conduit 156 to power control valve port 154 and thence to chamber 120 of throttling mechanism 103. Pressure existent in the motor return line 52 beyond the throttle 74 is transmitted to chamber 118 of throttling device 103 by means of port 54 of power control valve 26, bore 114, and longitudinal and transverse passages 142 and 144 of the spool 104. Any increases or decreases in pressure in the motor conduits 32 and 46 ahead of servo valve throttle 74 is thus transmitted to chamber 120 of throttling device 103 to shift the control piston and thus the spool lands 108 and 110 rightwardly to more fully close the passages 124 and 126 or leftwardly to move fully open said passages. The throttling device is thus responsive to pressures in the motor return line ahead of and beyond the servo valve throttle 74 to provide throttling to and from the motor and to maintain the pressure drop across the throttle 74 substantially constant. With the pressure drop constant across the throttle 74 the gain of the servo valve 38 will be constant for every given opening of the throttle 74.

The valve 38 may be operated to any desired operating position to provide desired amplitude of motor movement and the follow-up linkage causes relative movements of the body and valve spool to return the valve to the neutral position shown. The motor 30 may be accurately controlled not only as to amplitude of movement but as to rate of movement by the servo valve 38 in cooperation with the power control valve 26.

As previously recited, it is preferred that the servo valve be designed to permit leakage across the operating ports of the valve and should be greater than the static leakage of the throttling devices of the power control valve 26. If flow ceased through the throttling devices the operating springs thereof would shift the devices to their fully open position and if the servo valve was then operated from the neutral position the flow rate across the servo valve throttle would be temporarily uncontrolled. Although the lapse would be only temporary until the throttling device shifted into a throttling operating position, it would in some cases cause motor jump. Where extremely accurate and precise control is desired this is harmful. By permitting leakage across the servo valve throttle through the power control valve 26 the throttling devices are continually maintained in operating position when the servo valve is in a neutral position. Thus, when the servo valve is shifted from neutral to an operating position the throttling devices of the power control valve are already in operating position to immediately cooperate with the servo valve for immediate and accurate response and control of the motor.

In addition, shock loads transmitted to the servo valve will be immediately dampened at the throttling device of the power control valve. As the pressure drop is controlled across the servo valve, when the valve is operated due to a shock load, high frequency chatter is not permitted to develop at the servo valve. Unlike conventional hydraulic servo mechanism systems in addition to cushioning at the opposite ends of the motor the large operating areas of the control pistons of the throttling device provided adequate damping which prevents natural high frequency chatter to develop. As the servo valve metering is at a constant pressure, being under the constant control of the throttles in the power control valve, the Bernoulli forces acting on the servo valve are low and there is consequently no greatly unbalanced flow energy for creating oscillation instability at the servo valve. Any oscillation tendency there may be is very easily handled by inherent damping in the servo valve due to either sliding or viscous friction which is sufficient to prevent oscillation of this type. As to oscillations caused from the feedback which could be coupled therewith, the feedback has to be initiated by motion of the load and the load is controlled by the power control valve throttles. The decay in amplitude of motion of the operating pistons for the throttles of the power control valve as frequency increases, cuts down the amplitude of motion of the load and hence the feedback oscillation to the servo valve spool. Consequently the effect of factors in the feedback system causing lag are not felt at high frequencies and a stable system is the result.

It should thus be noted that the incorporation of the power control valve in the servo system in the manner recited causes the flow to pass through a variable throttle ahead of the motor and that return flow from the motor passes through first the variable throttle associated with the servo control valve and lastly through a third variable throttle. The first and the third variable throttles have a single operating means which is responsive to the pressures ahead of and beyond the servo control valve throttle in the motor return line. In addition to throttling fluid to the motor the power control devices maintain a constant pressure drop across the servo valve throttle so as to maintain the gain of the servo valve constant for every given opening of the valve. This gain is constant and accurately controlled independently of pressure changes due to changes in load.

The system is designed to be responsive and stable and to accurately control not only opposing but overrunning loads. Consequently the invention is very desirable for use in airplane control surface systems where, for example, a heavy opposing load may be encountered in the lowering of wing flaps or of an elevator and where the load may become an overrunning one in the raising of such control surfaces. Due to the fact that the return flow is not only metered or controlled at the servo valve but also by the land of the throttling device in the power control valve, the displacement of the motor is never more than the design of the system permits. The present system will thus give accurate and precise rate control in addition to precise and accurate directional response.

The present system not only gives accurate and precise response and control for every given opening of the servo valve throttle but in addition dangerous flight irregularities due to hunting in the system are eliminated. Hunting difficulties have been circumvented by not permitting unfavorable forces to react on the servo valve during operation either from the input or the feedback side of the system as the pressure drop is always controlled across the servo valve by the pressure operated throttling devices in the power control valve and which also provides sufficient damping qualities as well. Unfavorable conditions reacting on the servo valve to create hunting, such as high pressure drop and unfavorable Bernoulli forces resulting from high dynamic flow conditions are not permitted. The load is not only continually cushioned but any tendency for unfavorable oscillations in the feedback system are immediately sensed, taken up and dissipated at the power control valve.

While the form of embodiment of the invention as herein disclosed constitutes a preferred form, it is to be understood that other forms might be adopted, all coming within the scope of the claims which follow.

What is claimed is as follows:

1. A hydraulic servo control system comprising a reversible fluid motor for driving a load device, means forming a substantially constant pressure fluid source connected to said motor for driving the same, a servo valve for controlling the direction of operation of the motor and linked thereto to provide a follow-up action, said servo valve having a range of operation providing a variable throttle through which flow from the motor must pass, a second variable throttle through which flow to the motor must pass, and operating means for the second throttle responsive to the pressures ahead of and beyond the servo throttle to maintain a substantially constant pressure drop across the servo valve throttle for every opening thereof and thereby maintaining the gain of said servo valve constant.

2. A hydraulic servo control system comprising a fluid motor for driving a load device, a servo valve for controlling the directional operation of the motor, said servo valve having a range of operation providing a variable throttle through which motor return flow must pass, means forming a substantially constant pressure fluid source for driving the motor, a power control valve comprising two variable throttles, through one of which flow to the motor must pass and through the other of which all motor return flow must pass, and operating means for the latter two throttles responsive to the pressures ahead of and beyond the servo valve throttle for simultaneously regulating the flow to and from the motor and maintaining a substantially constant pressure drop across the servo valve throttle for every opening thereof thereby maintaining the gain of the servo valve constant.

3. A hydraulic servo control system comprising a fluid motor for driving a load device, a servo valve for controlling the directional operation of the motor, said servo valve having a range of operation providing a variable throttle through which motor return flow must pass, means forming a substantially constant pressure fluid source for driving the motor, a power control valve comprising two variable throttles, through one of which flow to the motor must pass and through the other of which all motor return flow must pass beyond the servo valve throttle, and a single operating means for the latter two throttles responsive to the pressures ahead of and beyond the servo valve throttle for simultaneously regulating the flow to and from the motor and maintaining a substantially constant pressure drop across the servo valve throttle for every opening thereof thereby maintaining the gain of the servo valve constant.

4. A hydraulic servo control system comprising a double acting fluid motor for driving a load device, means forming a substantially constant pressure fluid source connected to both ends of said motor, a servo control valve for controlling the direction of the motor by selectively opening one and closing the other end of the motor to a return source, said servo valve being linked to the motor to provide a follow-up action and having ranges of operation providing a variable throttle for return flow of the motor, and a power control valve comprising two variable throttles, through one of which all flow to the motor must pass and through the other of which all return flow must pass, and operating means for the latter throttles responsive to the pressures ahead of and beyond the servo valve throttle for simultaneously regulating the flow to and from the motor and maintaining a substantially constant pressure drop across the servo valve throttle for every opening thereof independently of load pressure variations thereby maintaining the gain of the servo valve constant.

5. A hydraulic servo control system comprising a double acting fluid motor for driving a load device, means forming a substantially constant pressure fluid source connected to both ends of said motor, a servo control valve for controlling the direction of the motor by selectively opening one and closing the other end of the motor to a return source, said servo valve being linked to the motor to provide a follow-up action and having ranges of operation providing a variable throttle for return flow of the motor, and a power control valve comprising two variable throttles, through one of which all flow to the motor must pass and through the other of which all return flow must pass, and operating means for the latter throttles responsive to the pressures ahead of and beyond the servo valve throttle for simultaneously regulating the flow to the motor and controlling the flow across the servo valve controlled throttle for given openings thereof and thereby regulating and controlling the gain of the servo valve.

6. A hydraulic servo control system comprising a reversible fluid motor for driving a load device; means forming a substantially constant pressure fluid source connected to said motor for driving the same; manually operable means for conjointly controlling the directional operation of the motor and regulating the flow rate therefrom, said means including a servo control valve and a variable throttle through which flow from the motor must pass and the opening of which is controlled by operation of the servo control valve; and a second variable throttle through which flow to the motor must pass, said second throttle being responsive to the pressures ahead of and beyond the servo controlled throttle to maintain a substantially constant pressure drop across the latter throttle for every given opening thereof independently of load pressure variations.

7. A hydraulic servo control system comprising a fluid motor for driving a load device; means forming a substantially constant pressure fluid source for driving the motor; manually operable means for conjointly controlling the directional operation of the motor and regulating the flow rate therefrom, said means including a servo control valve and a variable throttle through which flow from the motor must pass and the opening of which is controlled by operation of the servo control valve; a power control valve comprising two variable throttles, through one of which all flow to the motor and the other of which all flow from the motor must pass; and a single operating means for both of said latter throttles responsive to the pressures ahead of and beyond the servo controlled throttle to maintain a constant pressure drop across the latter throttle for every opening thereof and thereby maintaining the gain of the system constant for every given opening of the servo controlled throttle.

8. A hydraulic servo control system comprising a fluid motor for driving a load device; means forming a substantially constant pressure fluid source for driving the motor; manually operable means for conjointly controlling the directional operation of the motor and regulating the flow rate therefrom, said means including a servo control valve and a variable throttle through which flow from the motor must pass and the opening of which is controlled by operation of the servo control valve; a power control valve comprising two variable throttles, through one of which all flow to the motor must pass and the other of which all flow from the motor must pass beyond the servo controlled throttle; and a single operating means for both of said latter throttles responsive to the pressures ahead of and beyond the servo controlled throttle to maintain a constant pressure drop across the latter throttle for every opening thereof and thereby maintain the gain of the system constant for every given opening of the servo controlled throttle.

9. A constant gain hydraulic power transmission system comprising a reversible fluid motor for driving a load device; means forming a substantially constant pressure fluid source for driving the motor; manually operable means for conjointly controlling the directional operation of the motor and regulating the flow rate therefrom, said means including a first variable throttle through which flow from the motor must pass; a pair of pressure responsive throttles through one of which flow to the motor must pass and through the other of which flow from the motor must pass; and operating means for the pair of variable throttles responsive to the pressures ahead of and beyond the first variable throttle to maintain a substantially constant pressure drop across the first throttle for every given opening thereof independently of load pressure variations and thereby maintaining the gain of the system constant for every given opening of the first variable throttle.

10. A constant gain hydraulic power transmission system comprising a reversible fluid motor for driving a load device; means forming a substantially constant pressure fluid source for driving the motor; manually operable means for conjointly controlling the directional operation of the motor and regulating the flow rate therefrom, said means including a first variable throttle through which flow from the motor must pass; a pair of pressure responsive throttles through one of which flow to the motor must pass and through the other of which flow from the motor must pass beyond the first variable throttle; and operating means for the pair of variable throttles responsive to the pressures ahead of and beyond the first variable throttle to maintain a substantially constant pressure drop across the first throttle for every given opening thereof independently of load pressure variations and thereby maintaining the gain of the system constant for every given opening of the first variable throttle.

References Cited in the file of this patent

UNITED STATES PATENTS

| | | |
|---|---|---|
| 1,964,196 | Cuttat | June 26, 1934 |
| 2,157,707 | Keel | May 9, 1939 |